United States Patent [19]

Cense et al.

[11] Patent Number: 4,533,939
[45] Date of Patent: Aug. 6, 1985

[54] INTEGRABLE HUE CONTROL CIRCUIT HAVING A D.C. SETTING ELEMENT

[75] Inventors: Adriaan Cense; Evert H. Schutte, both of Nijmegen, Netherlands

[73] Assignee: U.S. Philips Corporation, New York, N.Y.

[21] Appl. No.: 585,968

[22] Filed: Mar. 5, 1984

[30] Foreign Application Priority Data

Mar. 22, 1983 [NL] Netherlands ............... 8301014

[51] Int. Cl.³ ........................................ H04N 9/535
[52] U.S. Cl. .................................................. 358/28
[58] Field of Search ..................................... 358/28

[56] References Cited

U.S. PATENT DOCUMENTS 3,781,701 12/1973 Cecchin et al. ............... 358/28
4,051,519 9/1977 Harwood ...................... 358/28
4,253,109 2/1981 Tzakis .......................... 358/28

FOREIGN PATENT DOCUMENTS 0013884 1/1982 Japan ........................... 358/19

Primary Examiner—John W. Shepperd
Attorney, Agent, or Firm—Thomas A. Briody; William J. Streeter; Edward W. Goodman

[57] ABSTRACT

In a hue control circuit for controlling the phase between a color synchronizing signal and a chrominance signal by a setting element (57), this phase control is obtained without the amplitude being influenced, by deriving (via 17) from the original color synchronizing or chrominance signal a color synchronizing or chrominance signal whose phase is shifted through 90° and by controlling the amplitude of each of these color synchronizing or chrominance signals and adding these signals together (in 35). One color synchronizing or chrominance signal is amplitude-controlled cosinusoidally (by 25) and the other color synchronizing or chrominance signal is amplitude-controlled sinusoidally (by 13) by means of the setting element (57).

3 Claims, 2 Drawing Figures

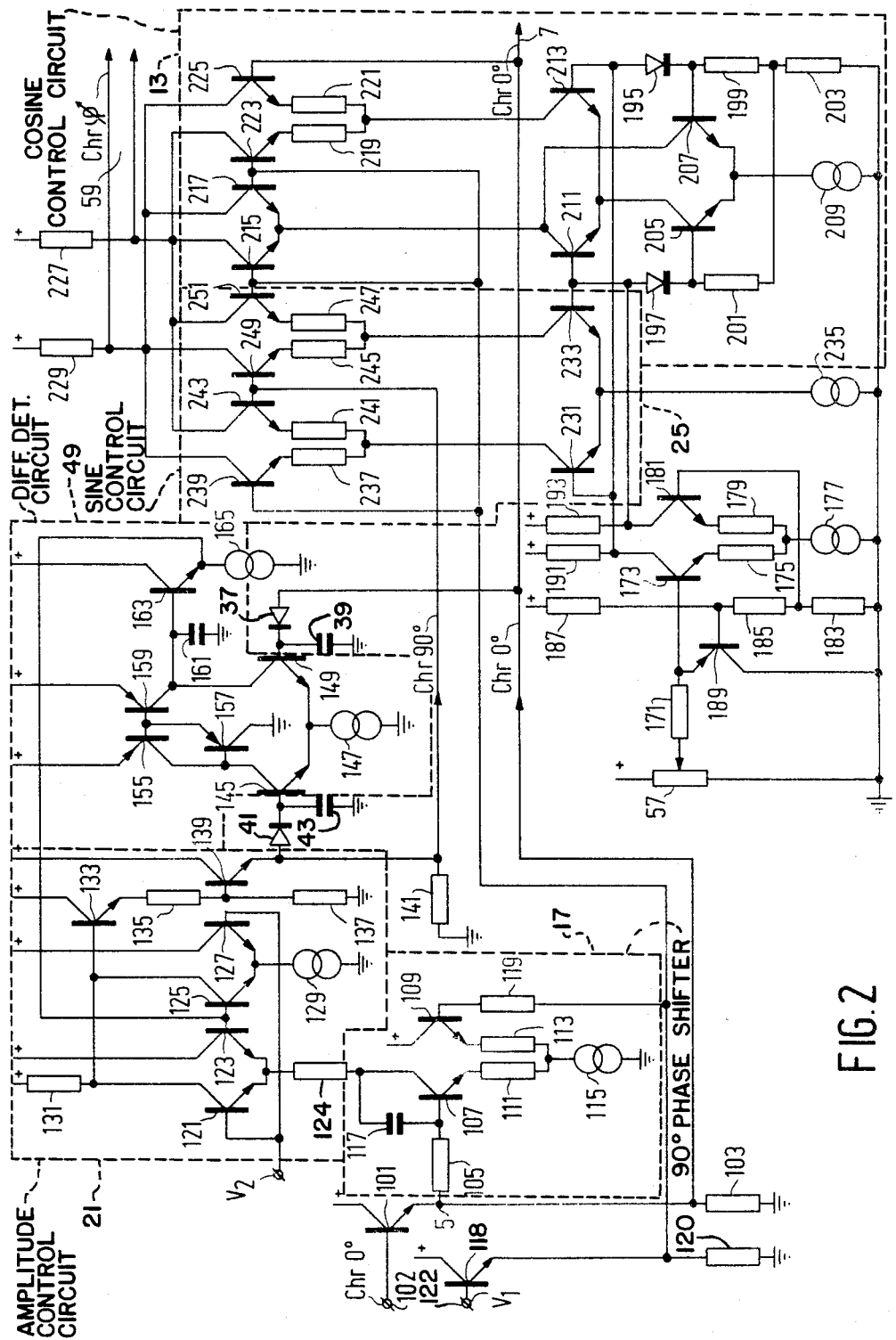

INTEGRABLE HUE CONTROL CIRCUIT HAVING A D.C. SETTING ELEMENT

BACKGROUND OF THE INVENTION

The invention relates to a hue control circuit comprising a setting element for substantially, without affecting the amplitude, shifting the phase of a color synchronizing signal and a color television chrominance signal to be demodulated with respect to each other.

U.S. Pat. No. 3,518,363 discloses such a hue control circuit wherein the phase of the color synchronizing signal is influenced by detuning a circuit with the aid of a capacitance arranged in parallel with an adjustable portion of a potentiometer connected across a portion of the circuit. The connections to the potentiometer then carry an a.c. voltage as a result of which the circuit is critical as regards the position of its several parts.

SUMMARY OF THE INVENTION

The invention has for its object to implement the circuit in such a way that the setting element may be provided in an appropriate position and that the remaining portion of the circuit can be constructed as an integrated circuit to the highest possible extent.

According to the invention, a hue control circuit of the above-mentioned type is therefore characterized in that an input of the hue control circuit is coupled to an adder circuit via a first control circuit and via a circuit which shifts the phase substantially through 90° and a second control circuit, the first and second control circuits being adjustable by means of a d.c. voltage which can be varied by the setting element, the first control circuit having a substantially cosinusoidal influence and the second control circuit a substantially sinusoidal influence on the amplitude of the signal conveyed through it as a function of the deviation of the d.c. voltage from that produced by the setting element in a normal position of this setting element.

As the setting element now produces a d.c. voltage, its position in the circuit is not critical. In addition, the control circuits and the circuit which shifts the phase through 90° can be constructed almost wholly in integrated form.

DESCRIPTION OF THE DRAWINGS

The invention will now be further described by way of example with reference to the accompanying drawings. In the drawings:

FIG. 2 illustrates, by means of a basic circuit diagram, a possible embodiment of a portion of a hue control circuit as shown in FIG. 1.

DESCRIPTION OF THE PREFERRED EMBODIMENT

Figure 1:
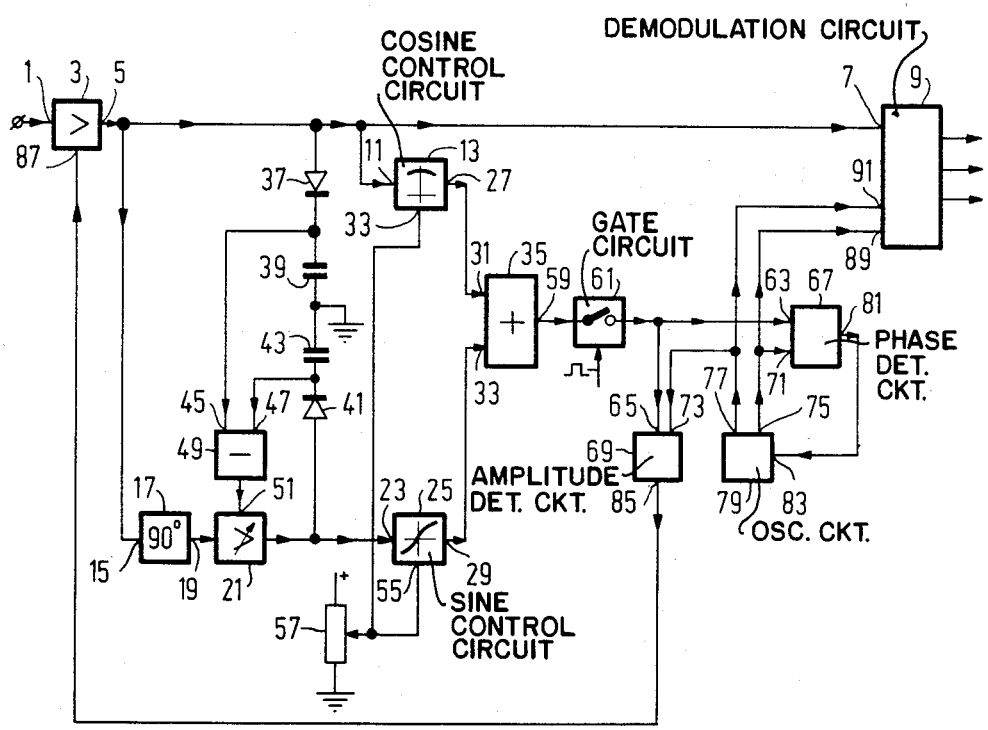
FIG. 1 illustrates, by means of a block diagram, a possible embodiment of a hue control circuit according to the invention.

In FIG. 1, a chrominance signal from a color television signal is applied to the input 1 of a variable gain amplifier 3. An output 5 of the amplifier 3 is connected to an input 7 of a demodulation circuit 9, to an input 11 of a first control circuit 13 and to an input 15 of a circuit 17 which produces a phase shift of substantially 90°.

An output 19 of the phase-shifting circuit 17 applies a 90° phase-shifted chrominance signal to an input 23 of a second control circuit 25 via an amplitude control circuit 21.

A pair of outputs 27 and 29, respectively, of the first and second control circuits 13 and 25, respectively, are connected to a pair of inputs 31 and 32, respectively, of an adder circuit 35.

A first detection circuit, comprising a diode 37 and a capacitor 39, is also connected to the output 5 of the amplifier 3 and a second detection circuit comprising a diode 41 and a capacitor 43, is also connected to the output of amplitude control circuit 21.

The first and second detection circuits 37, 39 and 41, 43, respectively, apply to inputs 45 and 47, respectively, of a difference-determining circuit 49, voltages representing the amplitude of the chrominance signal at the inputs 11 and 23, respectively, of the first and second control circuits 13 and 25, respectively. The difference-determining circuit 49 applies to a control signal input 51 of the amplitude-control circuit 21, a control signal which renders the amplitude of the signal at the input 23 of the second control circuit 25 equal to the amplitude of the signal at the input 11 of the first control circuit 13 without the amplitude of the signal at the input 11 of the first control circuit 13 being influenced.

The first and second control circuits 13 and 25, respectively, have control signal input 33 and 55, respectively, to which an adjustable d.c. voltage, originating from a setting element 57 in the form of a potentiometer, is applied. In a normal position of the wiper of this potentiometer 57, the first control circuit 13 supplies at its output 27 the maximum output signal amplitude and the second control circuit 25 supplies at its output 29 a signal amplitude equal to zero. The output signal amplitudes of the first and second control circuits 13 and 25, respectively, vary substantially cosinusoidally and sinusoidally, respectively, versus the deviation of the d.c. voltage supplied in the normal position by the potentiometer 57. As a result thereof, the amplitude of the chrominance signal appearing at an output 59 of the adder circuit 35 is substantially not influenced by the setting of the potentiometer 57, while the phase thereof is adjustable by means of the potentiometer 57 with respect to the phase of the chrominance signal at the input 7 of the demodulation circuit 9.

The color synchronizing signal of the chrominance signal at the output 59 of the adder circuit 35 is conveyed by way of a gate circuit 61 to the inputs 63 and 65, respectively, of a phase detection circuit 67 and an amplitude-detection circuit 69, respectively, to further inputs 71 and 73, respectively of which reference signals received from the outputs 75 and 77, respectively, of an oscillator circuit 79 are applied. A control signal received from an output 81 of the phase detection circuit 67 and applied to an input 83 of the oscillator circuit 79 adjusts the phase of the signal at its output 75 to 0° with respect to the phase of the color synchronizing signal at the input 63 of the phase detection circuit 67 and adjusts the phase of the signal at its output 77 to 90° relative thereto.

The amplitude detection circuit 69 supplies at its output 85 a control signal, the value of which is substantially not influenced by the setting of the potentiometer 57. This control signal is applied to a control signal input 87 of the variable gain amplifier 3, which in response thereto adjusts the amplitude of the chrominance signal at its output 5 such that the amplitude of the color synchronizing signal remains constant.

The outputs 71 and 77, respectively, of the oscillator circuit 79 are further connected to inputs 89 and 91, respectively, of the demodulation circuit 9 for applying reference signals thereto with the aid of which the color difference signals from the chrominance signal are demodulated. So the demodulation axes of the chrominance signal can be rotated by the potentiometer 57 without the control signal at the control signal input 87 of the variable gain amplifier 3 producing a change in amplitude when the position of the potentiometer 57 is changed. As a result thereof, only the hue and not the color saturation is influenced on display.

FIG. 2 shows a basic circuit diagram of an advantageous embodiment of that portion of the circuit shown in FIG. 1 which is comprised between the output 5 of the controllable amplifier 3 and the output 59 of the adder circuit 35 and the input 7 of the demodulation circuit 9. Corresponding parts have been given the same reference numerals as in FIG. 1.

The output 5 of the amplifier 3 is the output of an emitter follower 101, 103 to an input 102 of which the chrominance signal CHR 0° is applied of which the phase is not influenced.

The 90° phase-shifting circuit 17 is formed by a resistor 105 connected to the output 5 of the emitter follower 101, 103, a differential amplifier comprising two transistors 107, 109 the emitters of which are each connected via a resistor 111, 113 to a current source 115, and by a capacitor 117 connected between the collector and the base of the transistor 107. The base of the transistor 109 is connected via a resistor 119 to the output of an emitter follower 118, 120 whose input 122 is connected to a d.c. voltage V1 which is equal to the d.c. voltage level at the input 102. For that purpose, the input 122 can be connected to ground via a capacitance and to the input 102 via a resistor.

The collector of the transistor 107 is connected via a resistor 124 to the interconnected emitters of a pair of transistors 121, 123 of the amplitude control circuit 21 which further comprises a pair of transistors 125, 127 having interconnected emitters which are connected to a current source 129. The bases of the transistors 121 and 127 are connected to a d.c. voltage V2 and the control voltage is applied to the bases of the transistors 123 and 125. The collector of the transistor 121 is connected to a resistor 131, the collector of the transistor 125 and the base of a transistor 133 of an emitter follower circuit which further comprises two resistors 135, 137, a transistor 139 and a resistor 141. The base of the transistor 139 is connected to the junction between the resistors 135 and 137. A negative feedback resistor can be arranged between the emitter of the transistor 133 and the input 122, for the purpose of direct current stabilization.

Connected to the emitter of the transistor 139 is the second detection circuit comprising the diode 41 and the capacitor 43, the connection between the diode 41 and the capacitor 43 being connected to the base of a transistor 145 of the difference-determining circuit 49. The emitter of the transistor 145 is connected to a current source 147 and to the emitter of a further transistor 149 of the difference-determining circuit 49. The base of the transistor 149 is connected to the output of the first detection circuit which comprises the capacitor 39 and the diode 37 which is connected to the output 5 of the emitter follower 101, 103.

The collector of the transistor 145 is connected to the collector of transistor 149 via a current mirror circuit comprising three transistors 155, 157, 159, and is connected to a capacitor 161 across which a control voltage is produced which depends on the value of the difference between the amplitude of the phase-shifted chrominance signal component CHR 90° at the emitter of the transistor 139 and the amplitude of the 0° chrominance signal component CHR 0° at the emitter of the transistor 101. This control voltage is applied via an emitter follower 163, 165 to the bases of the transistors 123, 125 of the amplitude control circuit 21, which adjusts this difference substantially to zero.

The adjustable tap of the setting potentiometer 57 is connected via a resistor 171 to the base of a transistor 173, the emitter of which is connected to a current source 177 via a resistor 175 and, via a further resistor 179, to the emitter of a transistor 181, whose base is connected to a tap of a series arrangement of three resistors 183, 185, 187. The junction between the resistors 185 and 187 is connected to the base of a pnp transistor 189, whose collector is grounded and whose emitter is connected to the base of the transistor 173. The transistor 189 forms together with the resistor 171 a limiter which ensures that the voltage at the base of the transistor 173 cannot become too high.

The collectors of the transistors 173 and 181, respectively are connected to a positive voltage via resistors 191 and 193, respectively. In the normal position of the sliding contact of the setting potentiometer 57, the voltage difference between these collectors is zero and in a position deviating from this normal position, this voltage difference is positive or negative depending on the direction in which the sliding contact position of the potentiometer 57 deviates from the normal position.

The voltages on the collectors of the transistors 181 and 173 are respectively applied, via a level shifting circuit comprising two diodes 195, 199 and three resistors 197, 201, 203, to the bases of a first emitter-coupled pair of transistors 205 and 207, respectively, whose emitters are connected to a current source 209, the collector of the first transistor 205 being connected to the emitters of a second emitter-coupled pair of transistors 211 and 213.

The voltages on the collectors of the transistors 173 and 181 are also applied, respectively, to the based of the transistors 213 and 211 of the second pair of transistors.

The collector of the first transistor 211 of the second pair of transistors and the collector of the second transistor 207 of the first pair of transistors are connected to the emitters of a first and a second transistor 215 and 217, respectively, of a third pair of transistors. The collector of the second transistor 213 of the second pair of transistors is connected to the emitters of a first and a second transistor 223 and 225, respectively, of a fourth emitter-coupled pair of transistors via resistors 219 and 221, respectively.

The collector of the first transistor 215 of the third pair and the collector of the first transistor 223 of the fourth pair are connected to a connection of the output 59 and a resistor 227. The collector of the second transistor 217 of the third pair and the collector of the second transistor 225 of the fourth pair are connected to another connection of the output 59 and to a resistor 229.

The base of the second transistor 225 of the fourth pair is connected to the output 5 of the emitter follower 101, 103 and the bases of the first and second transistors 215, 217 of the third pair and the first transistor 223 of the fourth pair are connected to the d.c. voltage at the output of the emitter follower 118, 120.

In response to the control of both the first pair 205, 207 and the second pair 211, 213 by the collector voltages of the transistors 173, 181, the current through the second transistor 213 is at a maximum at the normal sliding contact position of the setting potentiometer 57 when the voltage difference between the bases of the transistors 211 and 213 and 205, 207, respectively, is zero. This current decreases both for a positive and a negative deviation of the sliding contact position of the setting potentiometer 57 relative to the normal position thereof. The change in the current through the transistor 213 is substantially consinusoidally, depending on the voltage difference between the collectors of the transistors 173 and 181.

The amplitude of the chrominance signal component CHR 0° appearing in the balanced state at the output 59 via the fourth pair of transistors 223, 225 consequently changes over a given setting range substantially cosinusoidally versus the voltage difference. The third pair of transistors 215, 217 provides a direct current compensation so that no d.c. voltage change occurs at the output 59 when the setting of the setting potentiometer 57 is changed.

The voltage difference at the collectors of the transistors 173, 181 is further applied to the bases of a first and a second transistor 231 and 233 respectively, of a fifth emitter-coupled pair of transistors, the emitters of which are connected to a current source 235. The collector of the first transistor 231 of this fifth pair is connected to the emitter of a first transistor 239, via a resistor 237, and to the emitter of a second transistor 243 of a sixth emitter-coupled pair of transistors, via a resistor 241. The collector of the second transistor 233 of this fifth pair is connected via resistors 245 and 247, respectively, to the emitters of a first and a second transistor 249 and 251, respectively, of a seventh emitter-coupled pair of transistors.

The base of the first transistor 239 of the sixth pair and the base of the second transistor 251 of the seventh pair receive the d.c. voltage from the output of the emitter follower 118, 120 while the base of the second transistor 243 of the sixth pair and the base of the first transistor 249 of the seventh pair receive the 90°-shifted chrominance signal CHR 90° from the output of the emitter follower 139, 141.

The collectors of the first transistors 239 and 249, respectively, of the sixth and seventh pairs, respectively, are connected to the resistor 229, and the collectors of the second transistors 243 and 251, respectively, of the sixth and seventh pairs, respectively, are connected to the resistor 227. These first transistors 239 and 249 and also the second transistors 243 and 251 are controlled in anti-phase by the chrominance signal CHR 90°, so that, because in the normal position of the setting potentiometer 57 the currents through the transistors 231 and 233 of the fifth pair are equal, no 90°-component of the chrominance signal is produced across the resistors 227 and 229. When the sliding contact of this setting potentiometer 57 deviates from the normal position, a 90°-component is indeed produced across these resistors, more specifically with an amplitude which over a given setting range depends substantially sinusoidally on the deviation of the voltage difference between the bases of the transistors 231, 233 with respect to this voltage difference in the normal sliding contact position.

As a cosinusoidal 0°-component which depends on that deviation was developed across the resistors 227, 229 via the fourth pair of transistors, a chrominance signal CHR $\phi$, which has an adjustable phase and a constant amplitude, is produced at the output 59.

It will be obvious that if so desired the gate circuit 61 can be provided in a different place in the circuit and/or can be of a multiple construction, distributed over several places if desired.

It is further of course possible to effect the hue control in the chrominance signal to be demodulated instead of in the color synchronizing signal, for example by coupling the input 7 of the demodulation circuit 9 to the output 59 of the adder circuit 35 and the input of the gate circuit 61 to the output 5 of the amplifier 3.

If so desired, the automatic amplitude control circuit 21, 49, 37, 39, 41, 43 can be omitted, although then generally an amplitude setting will be required.

What is claimed is:

1. A hue control circuit comprising a setting element for substantially, without influencing the amplitude, shifting the phase of a color synchronizing signal and a color television chrominance signal to be demodulated with respect to each other, characterized in that an input of the hue control circuit is coupled to an adder circuit via a first control circuit and via a circuit which shifts the phase substantially through 90° and a second control circuit, the first and second control circuits being adjustable by means of a d.c. voltage which can be varied by the setting element, the first control circuit having a substantially cosinusoidal influence and the second control circuit a substantially sinusoidal influence on the amplitude of the signal conveyed through it as a function of the deviation of the d.c. voltage from that produced by the setting element in a normal position of this setting element.

2. A hue control circuit as claimed in claim 1, characterized in that included between the 90°-phase-shifting circuit and the second control circuit there is an amplitude control circuit a control signal input of which is coupled via a difference-determining circuit of a first detection circuit which is coupled to an output of the amplitude control circuit and a second detection circuit which is coupled to the input of the 90°-phase-shifting circuit.

3. A hue control circuit as claimed in claim 2, characterized in that the first control circuit comprises a first, a second, a third, and a fourth pair of emitter-coupled transistors and the second control circuit comprises a fifth, a sixth and a seventh pair of emitter-coupled transistors, the emitters of the second pair of transistors being connected to the collector of the first transistor of the first pair of transistors, the emitters of the third pair of transistors being connected to the collectors of the first transistor of the second pair and of the second transistor of the first pair, the emitters of the fourth pair being connected to the collector of the second transistor of the second pair, the emitters of the sixth pair being connected to the collector of the first transistor of the fifth pair, the emitters of the seventh pair being connected to the collector of the second transistor of the fifth pair, the bases of the first transistor of the fifth pair and of the second transistor of the second pair being connected to a voltage which is adjustable by means of the setting element and to the base of the second transistor of the first pair via a first level shifting circuit, the bases of the second transistor of the fifth pair and of the first transistor of the second pair being connected to a voltage which can be adjusted in the opposite sense by means of the setting element and via a second level shifting circuit to the base of the first transistor of the first pair of transistors, the base of the first transistors of the sixth, third and fourth pairs and the base of the second transistor of the seventh pair being connected to a d.c. voltage, the base of the second transistor of the fourth pair being connected to the input of the 90° phase-shifting circuit, the bases of the second transistor of the sixth pair and of the first transistor of the seventh pair being connected to an output of the amplitude-control circuit, the collectors of the first transistors of the sixth and seventh pairs being connected to the collectors of the second transistors of the third and fourth pairs and to a first resistor, and the collectors of the second transistors of the sixth and seventh pairs being connected to the collectors of the first transistors of the third and fourth pairs and to a second resistor.

* * * * *